US008309912B2

(12) United States Patent
Schropp, Jr. et al.

(10) Patent No.: US 8,309,912 B2
(45) Date of Patent: Nov. 13, 2012

(54) ATMOSPHERIC PRESSURE ION TRAP

(75) Inventors: Donald R. Schropp, Jr., Austin, TX (US); Richard Lee Fink, Austin, TX (US); Igor Pavlovsky, Austin, TX (US)

(73) Assignee: Applied Nanotech Holdings, Inc., Austin, TX (US)

( * ) Notice: Subject to any disclaimer, the term of this patent is extended or adjusted under 35 U.S.C. 154(b) by 435 days.

(21) Appl. No.: 12/620,160

(22) Filed: Nov. 17, 2009

(65) Prior Publication Data

US 2010/0127167 A1 May 27, 2010

Related U.S. Application Data

(60) Provisional application No. 61/116,970, filed on Nov. 21, 2008.

(51) Int. Cl.
*B01D 59/44* (2006.01)
*H01J 49/00* (2006.01)

(52) U.S. Cl. ........ 250/281; 250/282; 250/287; 250/288; 250/289; 250/290; 250/291; 250/292

(58) Field of Classification Search .......... 250/281–282, 250/287–289, 290–292
See application file for complete search history.

(56) References Cited

U.S. PATENT DOCUMENTS

| | | | | |
|---|---|---|---|---|
| 2,939,952 | A | 6/1960 | Steinwedel et al. | |
| 3,065,640 | A | 11/1962 | Langmuir et al. | |
| 3,940,697 | A | 2/1976 | Morgan | |
| 4,540,884 | A | 9/1985 | Stafford et al. | |
| 4,999,642 | A | 3/1991 | Wells | |
| 5,179,461 | A | 1/1993 | Blauvelt et al. | |
| 5,248,883 | A | 9/1993 | Brewer et al. | |
| 5,420,424 | A | 5/1995 | Carnahan et al. | |
| 5,650,617 | A | 7/1997 | Mordehai | |
| 6,124,592 | A * | 9/2000 | Spangler | 250/287 |
| 6,161,426 | A * | 12/2000 | Byatt et al. | 73/61.49 |
| 6,469,298 | B1 | 10/2002 | Ramsey et al. | |
| 6,483,109 | B1 | 11/2002 | Reinhold et al. | |
| 6,762,406 | B2 | 7/2004 | Cooks et al. | |
| 6,982,413 | B2 | 1/2006 | Knecht et al. | |
| 7,161,142 | B1 | 1/2007 | Patterson et al. | |
| 7,270,020 | B2 | 9/2007 | Gregory et al. | |
| 7,294,832 | B2 | 11/2007 | Wells et al. | |
| 7,361,890 | B2 | 4/2008 | Patterson | |
| 2008/0128605 | A1 | 6/2008 | Wells et al. | |
| 2009/0146054 | A1 | 6/2009 | Rafferty | |
| 2009/0189069 | A1 * | 7/2009 | Chen et al. | 250/282 |

OTHER PUBLICATIONS

Benilan et al., "Ion Confinement by a Radiofrequency Electrical Field in a Cylindrical Trap," International Journal of Mass Spectrometry and Ion Physics, 11 (1973) pp. 421-432.

* cited by examiner

*Primary Examiner* — Jack Berman
*Assistant Examiner* — Meenakshi Sahu
(74) *Attorney, Agent, or Firm* — Kelly Kordzik; Matheson Keys Garsson & Kordzik PLLC

(57) ABSTRACT

An ion trap instrument working at atmospheric pressure, which alleviates requirements of bulky, power consuming vacuum pumps. Traps can accumulate selected ion species, effectively concentrating the analyte of interest and allowing laser spectroscopy to be performed. This lowers the detection threshold of this instrument compared to others and increases the selectivity.

20 Claims, 9 Drawing Sheets

Quadrupole Potential Ring and Endcaps

ATMOSPHERIC PRESSURE ION TRAP

CROSS-REFERENCE TO RELATED APPLICATION

This application claims priority to U.S. Provisional Patent Application Ser. No. 61/116,970.

TECHNICAL FIELD

This application relates in general to ion traps, and in particular, to ion traps operating at atmospheric pressures.

BACKGROUND

Instrumentation for trace compound detection and identification are perpetually pushed for increased sensitivity, lower detection limits, higher resolution and smaller physical size. The most sensitive instruments available include mass spectrometers (MS), which require high vacuum and are bulky with typical volumes on the order of 0.2 $m^3$. MS instruments can be either linear quadrupole or quadrupole ion traps. A second type of instrument, but which operates at atmospheric pressure, is the ion mobility spectrometer (IMS). Although the IMS and its closely related cousin, the Differential Mobility Spectrometer (DMS), have demonstrated sub-ppb detection capabilities, resolution between peaks is often poor, and for unknown multi-analyte mixtures, often peaks, and thus species, cannot be resolved.

DETAILED DESCRIPTION

The operating principle for mass spectrometers is to separate species by a mass to charge ratio, m/z, typically by employing an (oscillating) electric quadrupole field, and sometimes in conjunction with applied magnetic fields. The equation of motion for the ion species is:

$$m\frac{d^2\vec{x}}{dt^2} = q\vec{E}(\vec{x}, t)$$

The operating principle for ion mobility spectrometers is separation according to the ion's drift velocity through the ambient background gas under an applied electric field. The drift velocity is proportional to the electric field according to $$\vec{v}(t)=\kappa(E)\vec{E}(\vec{x},t)$$

where κ(E) is the ion mobility. Ion mobility κ(E) is often approximated as a constant, but it is actually a power series in even powers of E (so that the drift velocity is an odd power of $\vec{E}$ hence antisymmetric; when the electric field changes sign the velocity does too, which motion in an isotropic, homogeneous medium should do). Comparing the above two equations, and noting that the velocity is just the first time derivative of the position, the acceleration for an ion in a mass spectrometer is proportional to the electric field, whereas for an ion mobility spectrometer, the velocity is proportional to the electric field. That means the two principles of operation give rise to very different ion motion dynamics.

Figure 1:
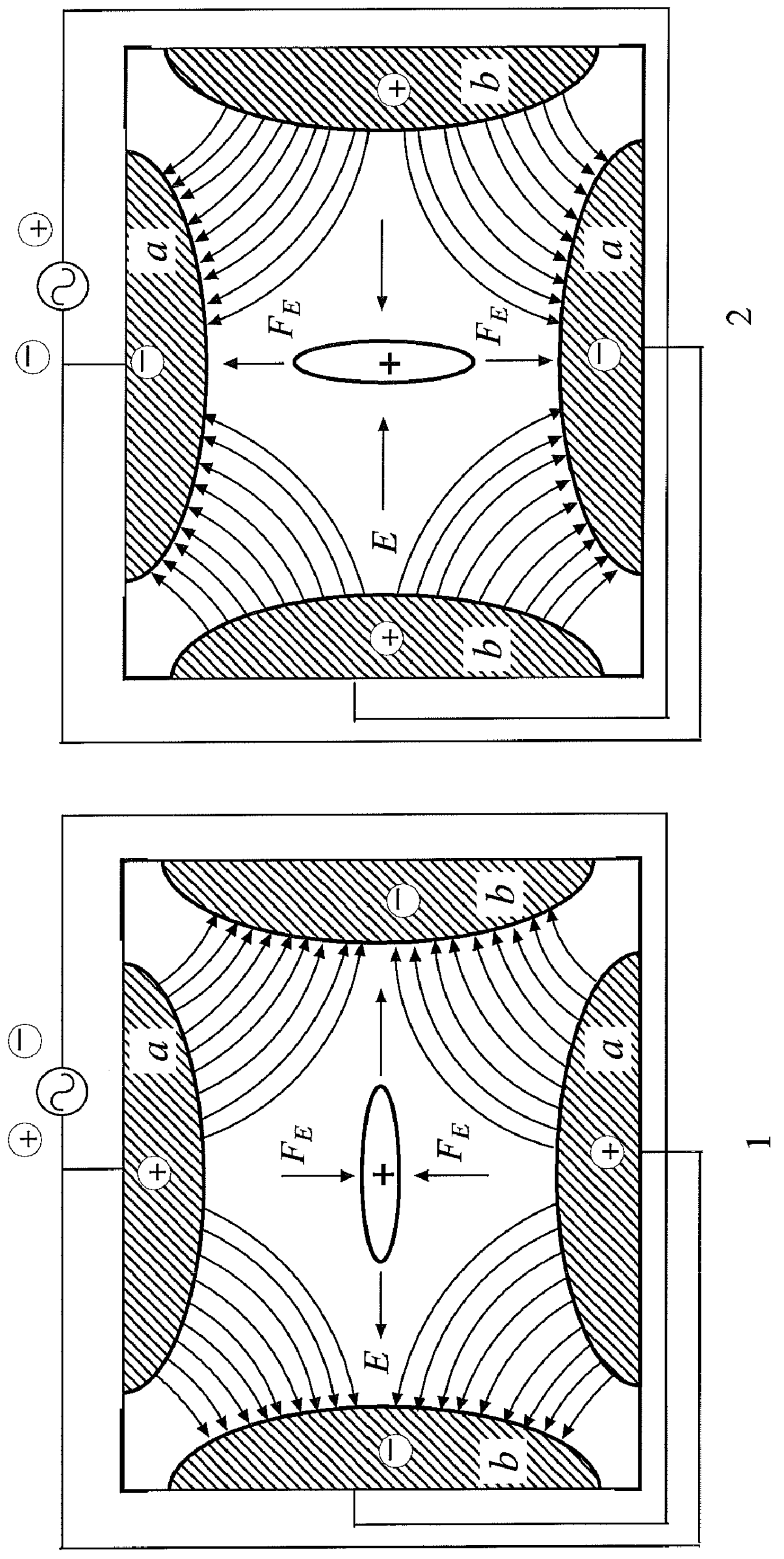
FIG. 1 illustrates a schematic of an ion trap, comprising two endcaps 'a' and a ring 'b' with an electric potential across them, where schematic (1) illustrates positive-biased endcaps and forces on positive ions, while schematic (2) illustrates a reverse bias case.

FIG. 1 illustrates a schematic of an ion trap. The quadrupole potential in the trap can generically be written $$\phi(\vec{r}) = \frac{\phi_0}{r_0^2}(\lambda x^2 + \sigma y^2 + \gamma z^2)$$

And to satisfy Laplace's equation, the condition $$\lambda+\sigma+\gamma=1$$

follows. For a quadrupole ion trap λ=σ=1, γ=−2. Writing the resulting potential in cylindrical coordinates gives:

$$\phi(r, z) = \frac{\phi_0}{r_0^2}(r^2 - 2z^2)$$

Figure 2:
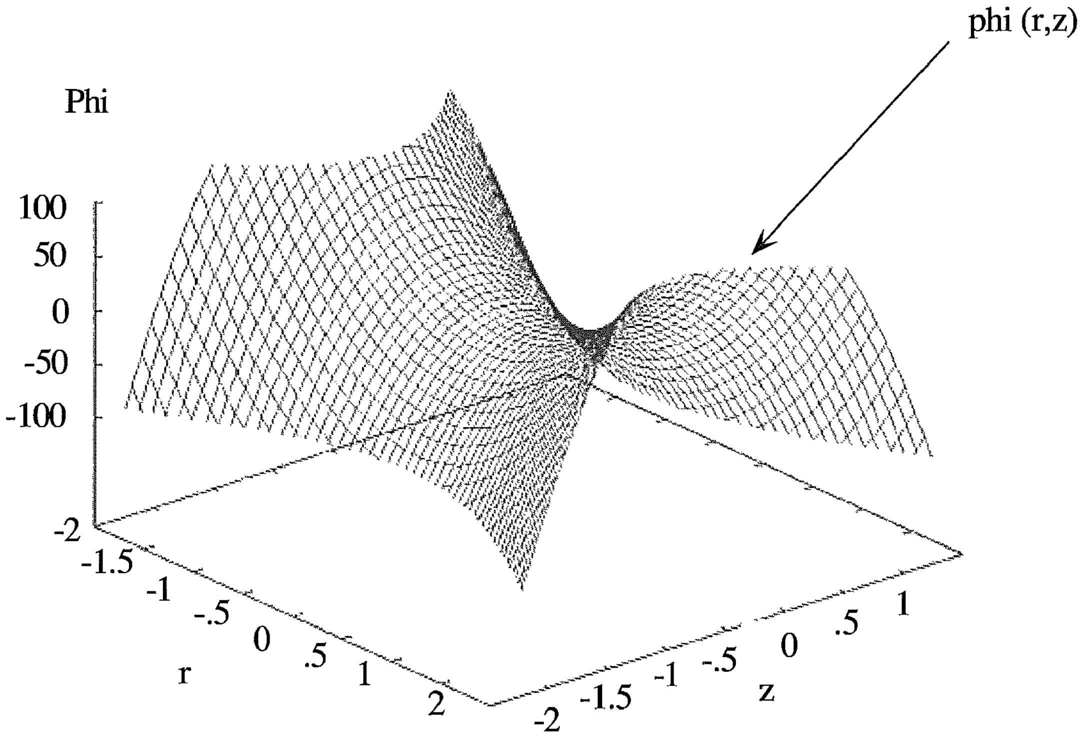
FIG. 2 illustrates potential in an ion trap.

For an arbitrarily chosen fixed value of Φ(r,z), the relationship between r and z define hyperbola, which are the shape of the ideal endcap and ring electrodes. A plot of the potential is shown in FIG. 2; it is saddle shaped, meaning for a positive ion, the force is radially inward and trapping but axially expelling toward the endcaps, corresponding to schematic (2) in FIG. 1. If the potential is reversed, the corresponding situation is then (1) of FIG. 1. The restoring force increases linearly in both radial and axial coordinates. In operation, the potential $\Phi_0$ is time dependent:

$$\phi_0(t)=U+V\cos(\omega t)$$

This oscillating potential alternately produces a trapping then anti-trapping potential in both the radial and axial coordinates. If the frequency ω and potential V are judiciously chosen, the excursion of the ion motion will always be less than the position of the electrodes, making a stable trap. This can be visualized by imagining the potential in FIG. 2 to rotate about the Phi axis at r=z=0; an ion will be jostled about under the influence of the time varying potential, but on average will experience a central restoring force. The ions can be cooled using momentum dissipation via a 10 mTorr background of helium gas admitted into the trap volume.

Collisions between ions and helium atoms remove energy from the ions, i.e., energetically cooling and confining them closer to the center of the trap.

A scan of the m/z ratios of all the different species of ions simultaneously held in the trap is made by sweeping the endcap-ring potential amplitude V and the frequency ω. An alternative process is to excite resonant ions using a small (few hundred millivolts) rf field across the two endcaps. This drives resonant ions into larger amplitude orbits where they are then forced into a detector electrode or channeltron type amplifier for current measurement.

Figure 3:
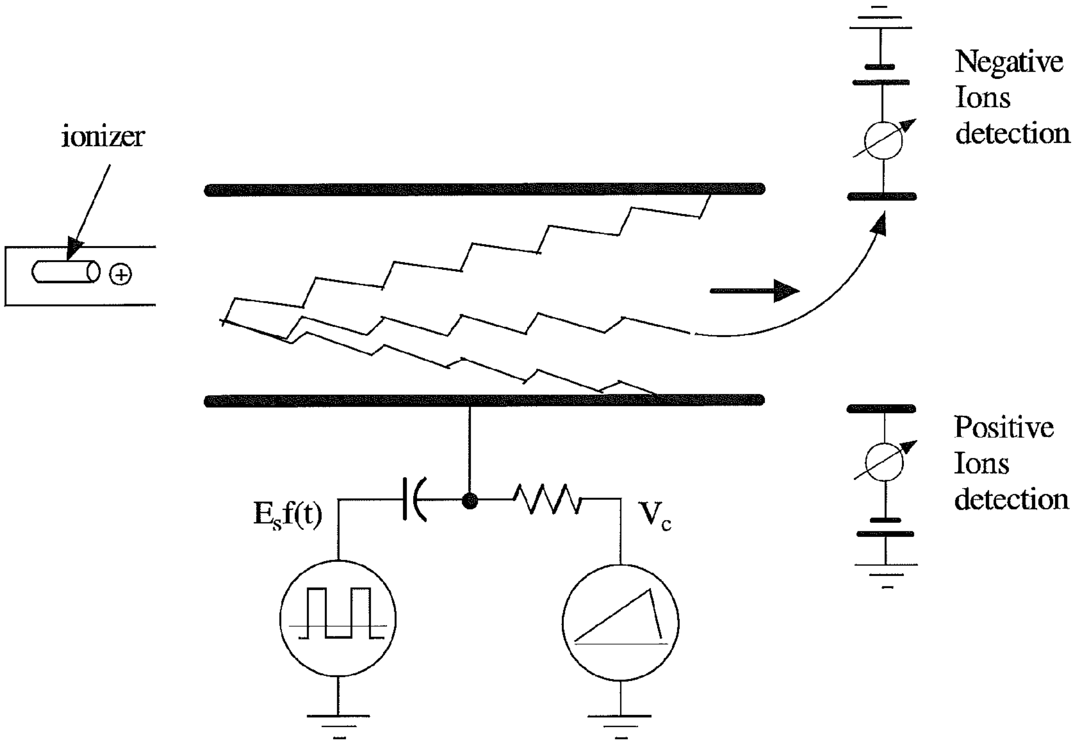
FIG. 3 illustrates a photo-acoustic sensor (PAS) cell.

FIG. 3 illustrates a schematic of a differential ion mobility spectrometer. Trace analytes in a carrier gas, often ambient atmosphere, are flowed from left to right between two parallel plate electrodes. The analyte molecules are ionized by charge exchange with reactive ions generated by radioactive or electric sources. An asymmetric waveform comprising a short duration, large positive potential pulse followed by a long duration, small negative potential pulse moves ions in the zigzag motion indicated in the figure. A net effect is usually to drive the ions into the RF plates.

By superimposing a small DC electric field across the parallel plates with the use of a compensation voltage Vc, the net trajectory can be made parallel to the plates. Resonant ions then pass through the filter and are detected upon exit by detection electrodes. As the compensation voltage is swept, peaks appear corresponding to different ion species.

An embodiment of the present invention described herein combines elements of both the mass spectrometer and the ion mobility spectrometer. The ion trajectories in atmosphere indicated in FIG. 3 are related to ion trajectories in vacuum in a linear ion quadrupole mass spectrometer. A similar principle that allows a linear quadrupole mass spectrometer to become a quadrupole ion trap allows the differential mobility spectrometer to become an atmospheric pressure ion trap.

Figure 5:
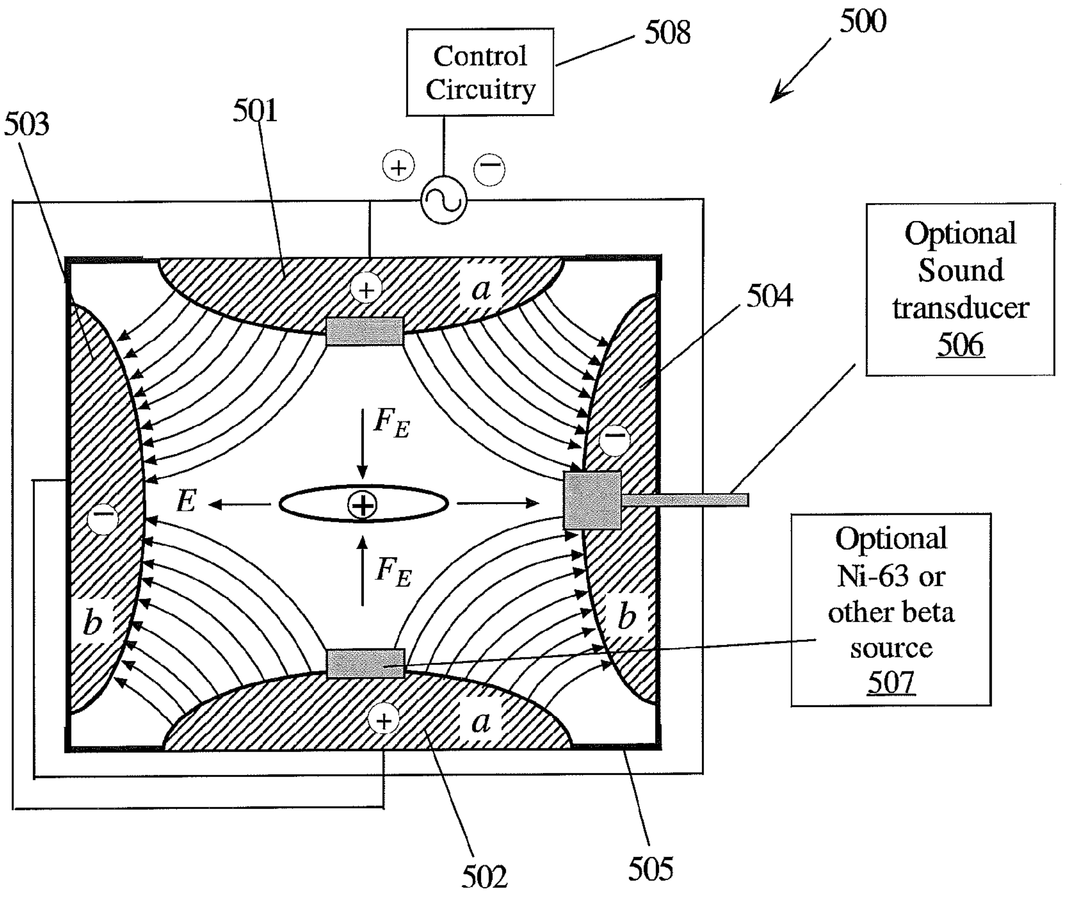
FIG. 5 illustrates a schematic of an embodiment of the present invention.
Figure 7:
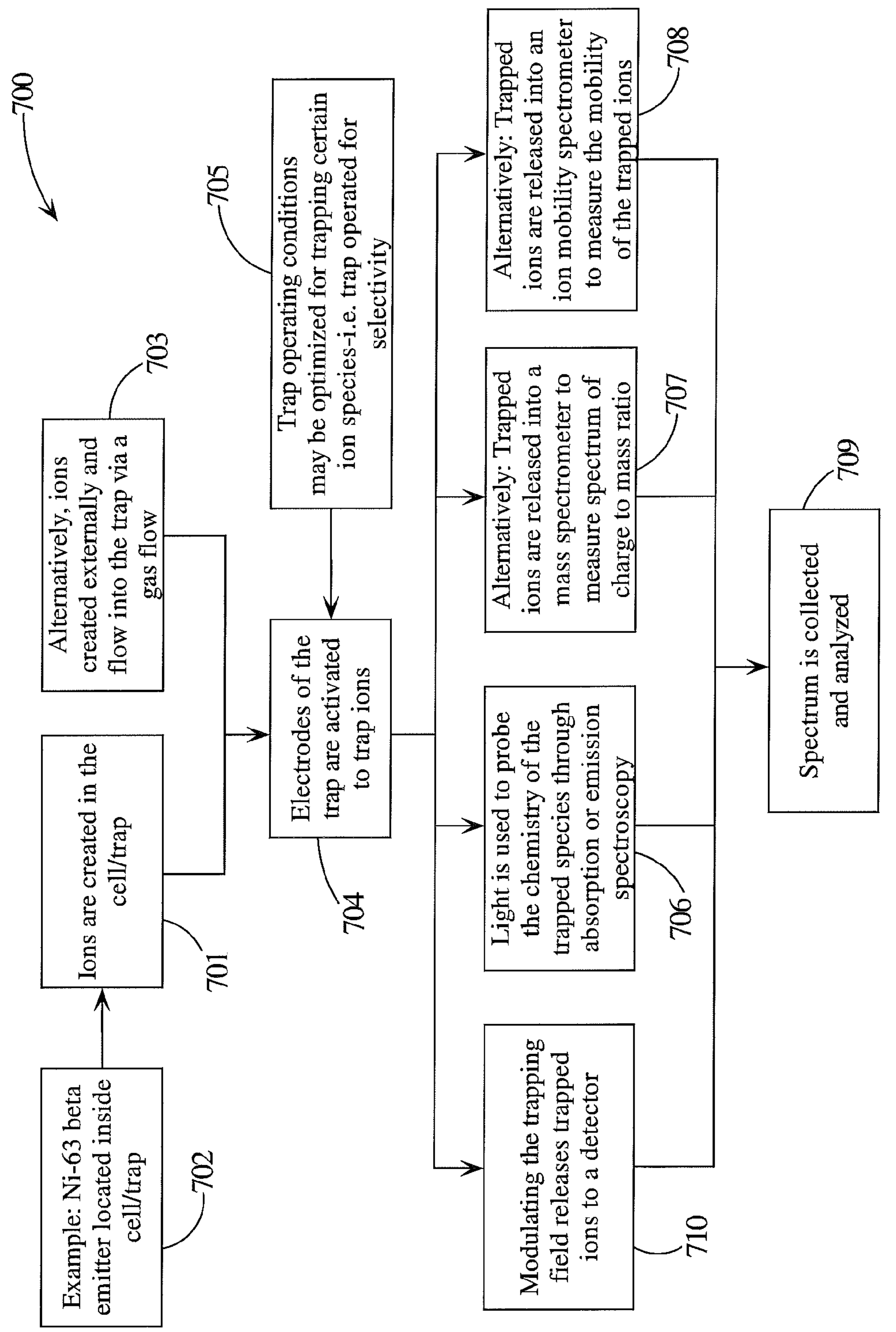
FIG. 7 illustrates a flow diagram in accordance with an embodiment of the present invention.

FIGS. 5 and 7 illustrate a trap 500 and its operation. Oscillating RF potentials are produced across the endcaps 501, 502 and ring electrode 503, 504 (see step 704). Trace analytes are ionized (step 701) via atmospheric pressure chemical ionization as in ion mobility spectrometers. A radioactive source 507 either external to the trap or possibly embedded within an electrode may be used (see step 702), or an external soft plasma or field ionization source may be employed. Externally generated ions may be loaded into the trap 500 by flowing them through the trap volume at low flow rates (see step 703). Ions slosh back and forth, but not necessarily symmetrically about the trap center. The ion's velocity is proportional to the instantaneous electric field, not the ion's acceleration, as is the case in conventional ion traps. Furthermore, the trap 500 may be operated with similar asymmetric waveforms as the differential mobility spectrometer, even including the DC compensation voltage, as directed by the control circuitry 508.

Because ion mobility is a function of the electric field strength, and the electric field increases linearly in both the radial and axial directions (but at different rates), ion trajectories are calculated numerically. A Monte Carlo simulation for this trap yields necessary performance characteristics. Once ions are trapped they may be selectively made to have larger excursion from the trap center until they strike a detector (step 710); or, laser spectroscopy may be performed for species identification (step 706). The detector may be a biased electrode, or a pair of biased electrodes, for sensing ions of + and − charges. Laser spectroscopy essentially recycles each ion's contribution to the signal so that extremely low concentrations are detectable. Alternatively, the ions may be released into a mass spectrometer (see step 707), or an ion mobility spectrometer (step 708). The spectrum may be collected and analyzed in step 709.

Another embodiment of an ion trap operating at atmospheric pressures uses the trap as an acoustic cell, which measures the concentration and types of ions that are created, which in turn permits a measure of trace chemicals in the atmosphere being probed.

Figure 4:
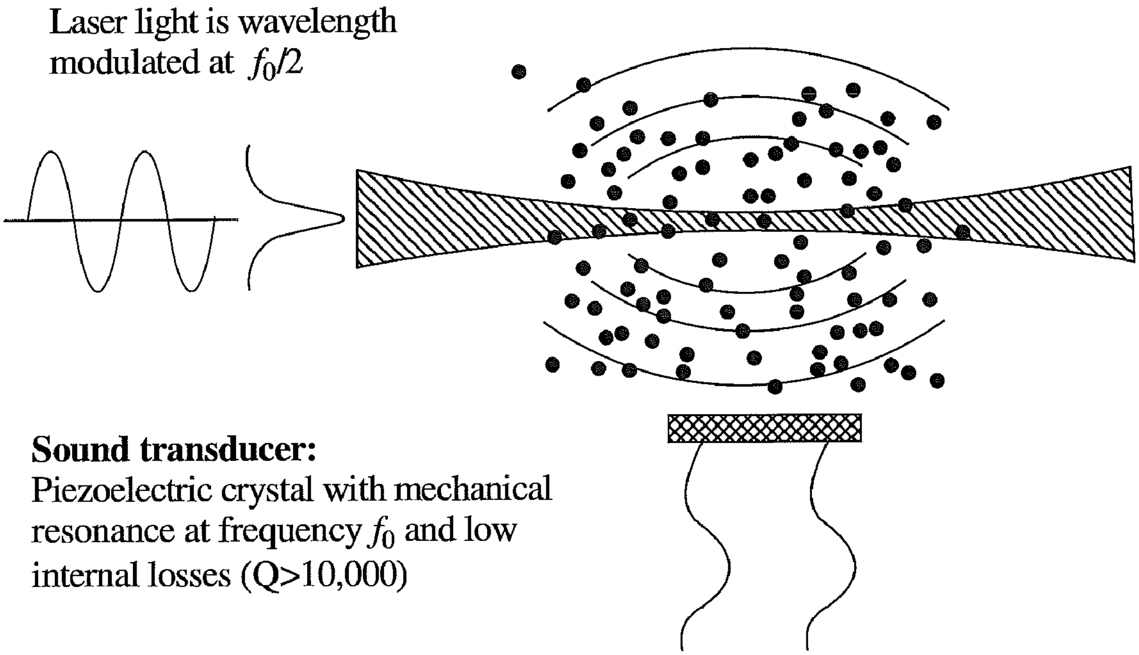
FIG. 4 illustrates an ion trap acoustic cell.

FIG. 4 illustrates a simplified schematic of a photo-acoustic cell ("PAS"). A gas is enclosed in a cell (not shown), with a cell volume on the order of 1 to 10 $cm^3$. A beam of light (e.g., laser light) is passed through the gas in the cell. If the light is absorbed by the gas, the gas will heat up. By modulating the frequency (color) of the light, or by modulating the intensity of the light, a sound wave is created in the cell from the pulses of heat applied to the gas from the light being absorbed. The sound waves are detected by a sound transducer (e.g., microphone). The wavelength of light may be chosen to be sensitive to a particular analyte. The intensity of the sound waves will have some proportion to the concentration of the analyte being detected. In this way, the concentration of specific analytes in a gas is detected. By using several frequencies of light, a plurality of analytes can be detected using one cell.

A problem with this approach is that the frequency (color) of the light may be hard to achieve except when using broad band light sources. However, in this case, the selectivity of the PAS will be degraded because of the broad spectral band of light used. Some telecom lasers exist in wavelengths useful for some analytes, but other analytes require expensive lasers. It may be preferential to excite the sound waves without using a light source. An ion trap acoustic cell addresses this issue.

Figure 8:
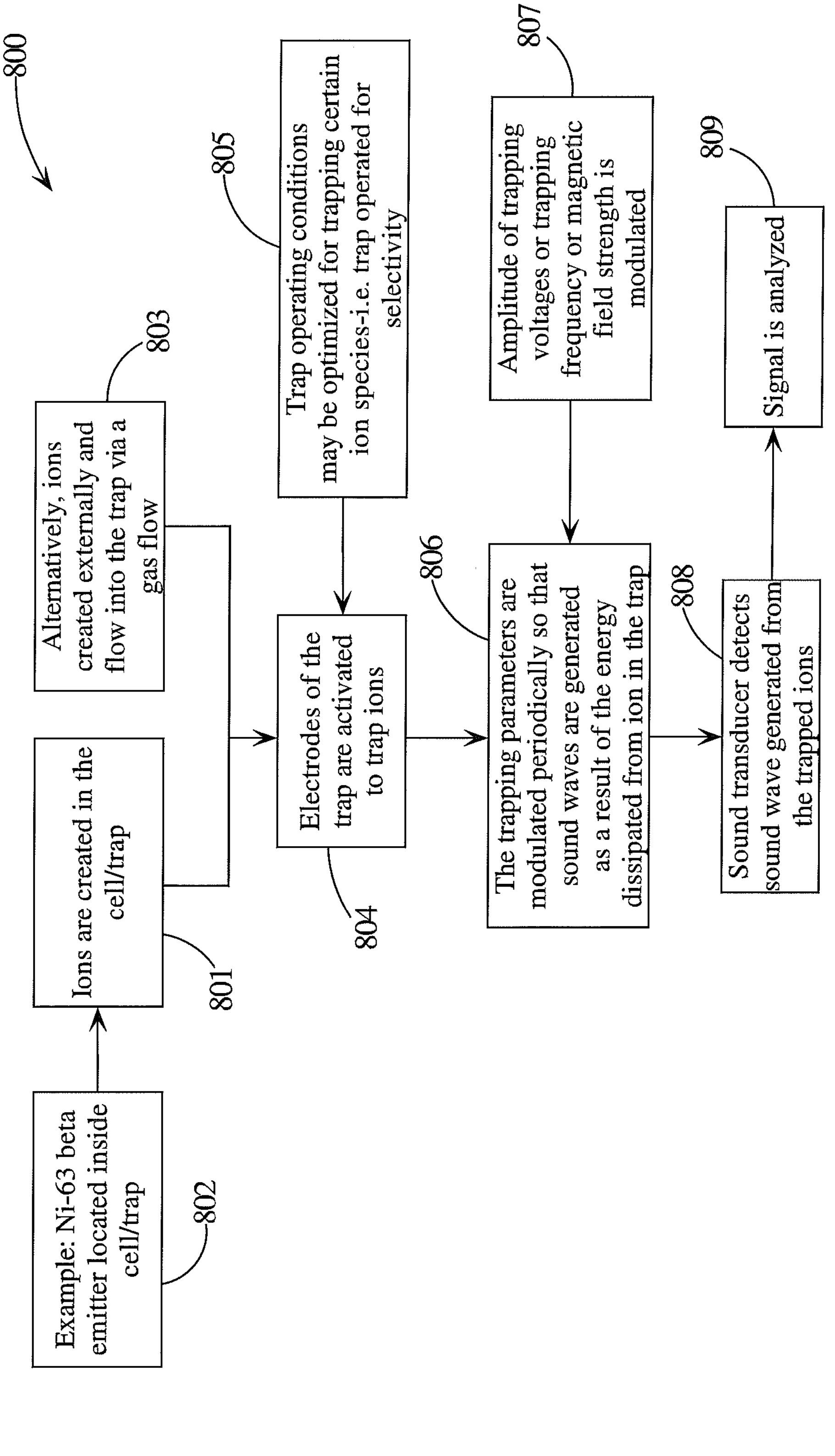
FIG. 8 illustrates a flow diagram in accordance with an embodiment of the present invention.

Referring to the schematic illustrated in FIG. 5, and the flow diagram of FIG. 8, an ion trap acoustic cell ("ITAC") 500 does not use a light source to excite the sound waves, but uses heat generated by exciting ions in the trap 500 (see steps 801 and 803). The ITAC 500 may be configured similar to a standard ion trap.

The electrodes 501-504 may be mounted on stiff, insulating walls 505. One or more holes (not shown) may be positioned on the cell walls 505 to allow gas to come in and out of the cell 500 (see step 803). A hole in one or more electrodes 501-504 may be used to position a microphone or sound transducer 506 to monitor for sound waves (see step 808). Ni-63 beta sources or other radioactive materials 507 may be placed inside the cell 500 to provide a source of electrons to create ions in the gas (see step 802). Other sources of electrons or ions may also be used, such as UV light, corona discharge, dielectric barrier discharge, or insulating barrier discharge. By changing the frequency of the oscillating RF electric potentials on the electrodes and by changing the voltage of the oscillating RF electric fields with control circuitry 508, specific ions can be trapped (see step 804). By modulating the RF on and off at acoustic frequencies (see step 807), sound waves are created in the cell 500 (see step 806). The intensity of the sound waves is proportional to the concentration of the analyte that is ionized. By sweeping through the parameters of the trapping field, the cell 500 can select which ions are trapped. The Ni-63 beta source 507 may be constantly creating ions. The ion trap 500 improves the sensitivity of acoustic cells since the trap 500 concentrates specific ions while more ions are continuously being made.

As noted previously, an advantage is that light sources are no longer needed. Selectivity of ions is performed by sweeping the electrical parameters of the trap 500 with the control circuitry 508. This opens the detection to a broad range of analytes (see step 809).

Figure 6:
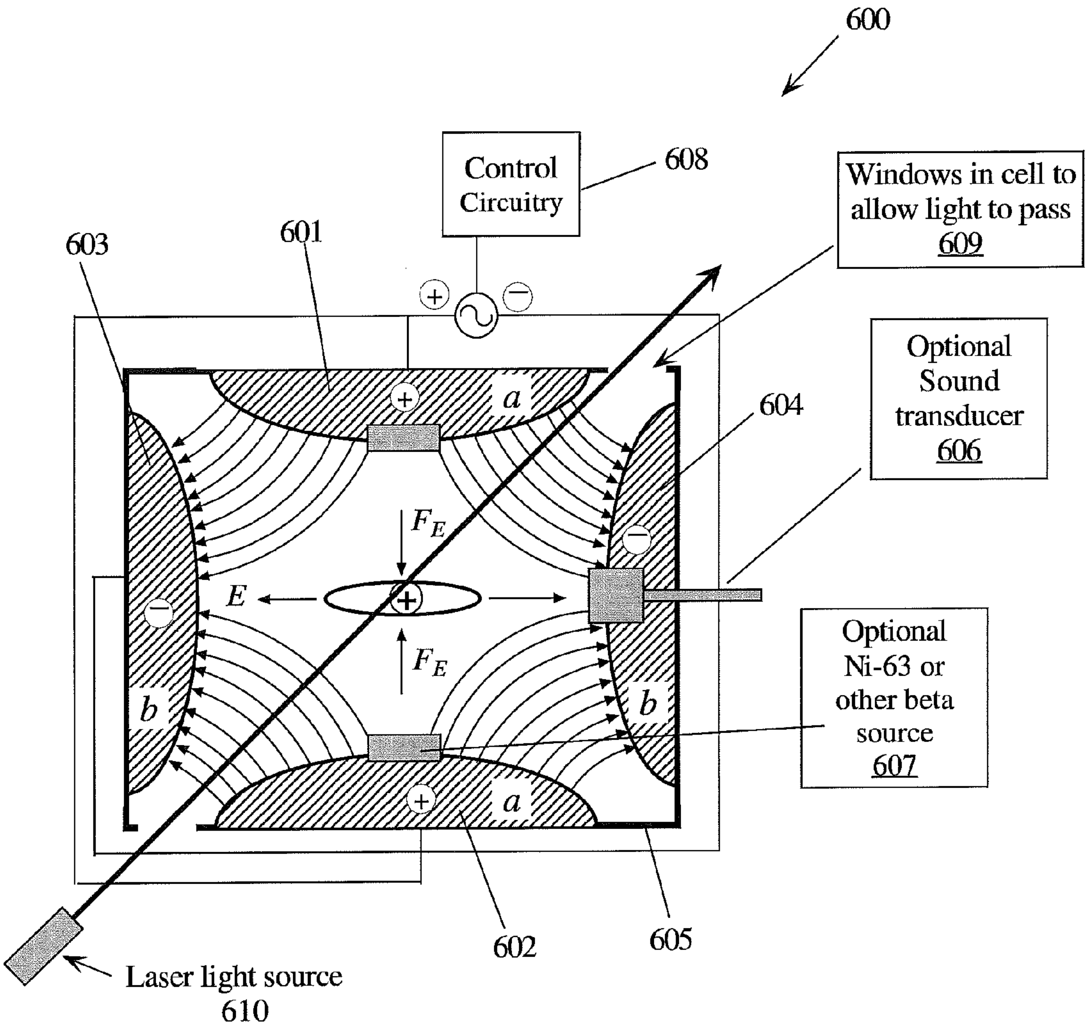
FIG. 6 illustrates a schematic of an embodiment of the present invention.
Figure 9:
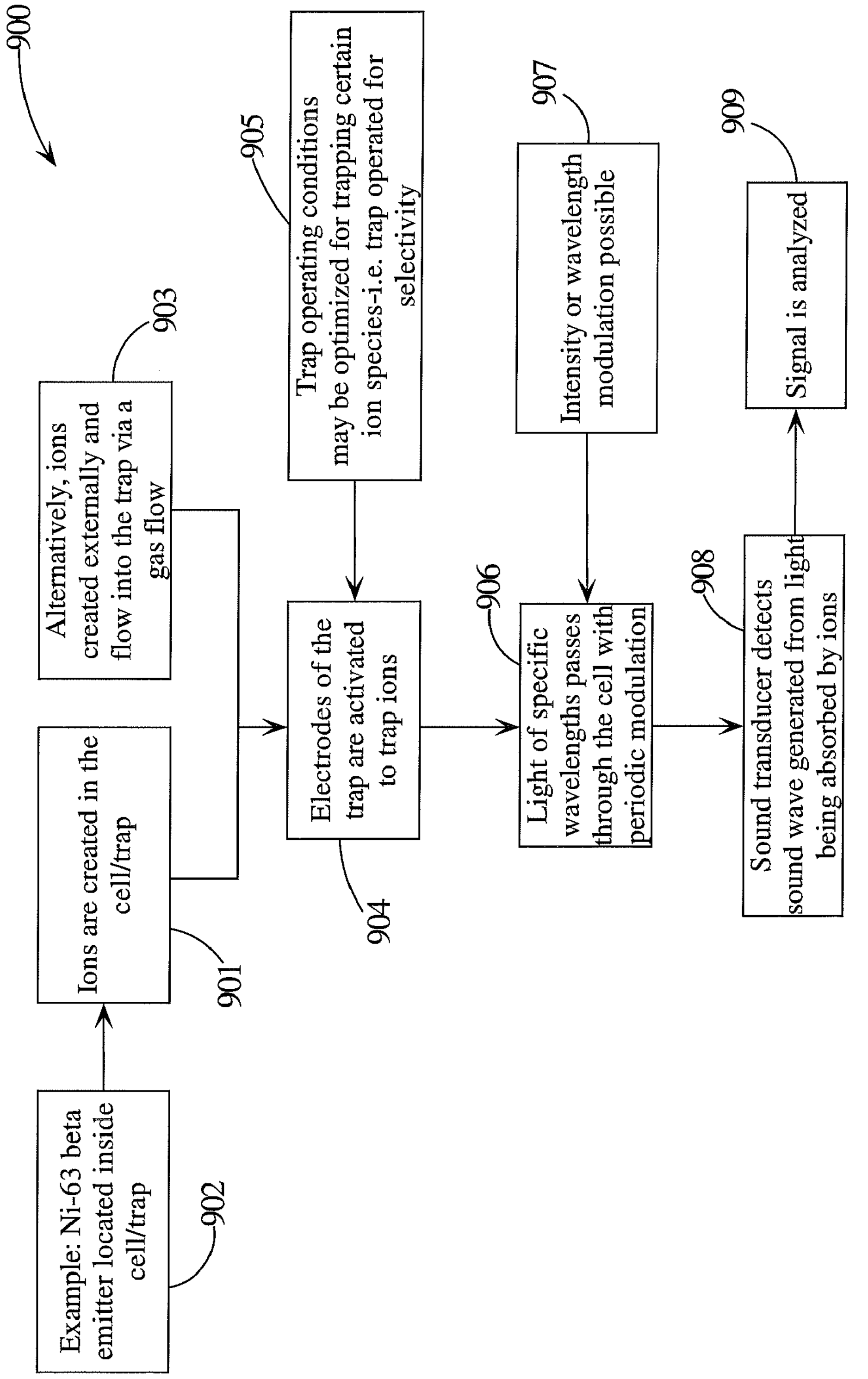
FIG. 9 illustrates a flow diagram in accordance with an embodiment of the present invention.

Referring to FIGS. 6 and 9, an alternative embodiment of a PAS 600 is illustrated, which is a combination of RF trapping with light assisted photo-acoustic sensing. Components 601-608 operate similarly as components 501-508, and steps 901-909 are similar to steps 801-809. In this embodiment, the ions in the trap 600 are selected by tuning the parameters of the ion trap 600 (the RF frequency and amplitude), but the trap 600 may be operated in constant intensity with the light 601 introduced and modulates as in standard photo-acoustic spectroscopy by the control circuitry 608 (see steps 906-907). This may be referred to as an ion-assisted PAS 600. An advantage is that it is possible to select different wavelengths to detect the analytes, allowing a lower cost laser 610 to be used for the PAS 600.

What is claimed is:

1. An ion trap comprising:

an ion trap cell in which a cell volume is enclosed at atmospheric pressure;

circuitry configured for creating ions within the cell volume of the ion trap cell; and circuitry configured for analyzing the ions.

2. The ion trap as recited in claim 1, wherein the circuitry configured for creating ions within the cell volume of the ion trap cell further comprises a radioactive source located within the cell volume of the ion trap cell.

3. An ion trap comprising:

an ion trap cell in which a cell volume is enclosed at atmospheric pressure;

circuitry configured for creating ions within the cell volume of the ion trap cell; and circuitry configured for analyzing the ions, wherein the circuitry configured for creating ions within the cell volume of the ion trap cell further comprises a beta emitter located within the cell volume of the ion trap cell.

4. The ion trap as recited in claim 1, wherein the circuitry configured for creating ions within the cell volume of the ion trap cell further comprises the ion trap configured for passing ions into the cell volume from an external source.

5. The ion trap as recited in claim 1, further comprising:

circuitry configured for light to probe a chemistry of the ions trapped in the cell volume through absorption or emission spectroscopy.

6. The ion trap as recited in claim 1, further comprising:

a mass spectrometer coupled to the ion trap; and a channel for passing the ions trapped from the cell volume to the mass spectrometer.

7. The ion trap as recited in claim 1, further comprising:

an ion mobility spectrometer coupled to the ion trap; and a channel for passing the ions trapped from the cell volume to the ion mobility spectrometer.

8. The ion trap as recited in claim 1, further comprising:

control circuitry configured for modulating electrodes in the ion trap to generate sound waves when energy is dissipated from the ions trapped in the cell volume; and a sound transducer enclosed within the cell volume for detecting the sound waves generated from the ions trapped in the cell volume.

9. The ion trap as recited in claim 1, further comprising:

a light source configured for emitting light into the cell volume; and a sound transducer enclosed within the cell volume for detecting sound waves generated from the light being absorbed by the ions trapped in the cell volume.

10. The ion trap as recited in claim 9, further comprising:

control circuitry configured for modulating the light emitted from the light source.

11. The ion trap as recited in claim 9, further comprising:

a mass spectrometer coupled to the ion trap; and a channel for passing the ions trapped from the cell volume to the mass spectrometer.

12. The ion trap as recited in claim 9, further comprising:

an ion mobility spectrometer coupled to the ion trap; and a channel for passing the ions trapped from the cell volume to the ion mobility spectrometer.

13. The ion trap as recited in claim 1, further comprising:

a detector coupled to the ion trap and configured for detecting ions released to the detector.

14. The ion trap as recited in claim 3, wherein the circuitry configured for creating ions within the cell volume of the ion trap cell further comprises the ion trap configured for passing ions into the cell volume from an external source.

15. The ion trap as recited in claim 3, further comprising:

a mass spectrometer coupled to the ion trap; and a channel for passing the ions trapped from the cell volume to the mass spectrometer.

16. The ion trap as recited in claim 3, further comprising:

an ion mobility spectrometer coupled to the ion trap; and a channel for passing the ions trapped from the cell volume to the ion mobility spectrometer.

17. The ion trap as recited in claim 3, further comprising:

control circuitry configured for modulating electrodes in the ion trap to generate sound waves when energy is dissipated from the ions trapped in the cell volume; and a sound transducer enclosed within the cell volume for detecting the sound waves generated from the ions trapped in the cell volume.

18. The ion trap as recited in claim 3, further comprising:

a light source configured for emitting light into the cell volume; and a sound transducer enclosed within the cell volume for detecting sound waves generated from the light being absorbed by the ions trapped in the cell volume.

19. The ion trap as recited in claim 18, further comprising:

control circuitry configured for modulating the light emitted from the light source.

20. The ion trap as recited in claim 3, further comprising:

a mass spectrometer coupled to the ion trap; and a channel for passing the ions trapped from the cell volume to the mass spectrometer.

* * * * *